Sept. 23, 1952     H. ETZELT     2,611,449
LUBRICATING PUMP
Filed July 29, 1947

INVENTOR.
HEINRICH ETZELT
BY
Robert E Burns
ATTORNEY.

Patented Sept. 23, 1952

2,611,449

UNITED STATES PATENT OFFICE 2,611,449

LUBRICATING PUMP

Heinrich Etzelt, Vienna, Austria, assignor to Alex. Friedmann, Kommanditgesellschaft, Vienna, Austria Application July 29, 1947, Serial No. 764,523
In Germany November 15, 1943

Section 1, Public Law 690, August 8, 1946
Patent expires November 15, 1963

6 Claims. (Cl. 184—27)

This invention relates to an arrangement for regulating the quantity delivered by lubricating pumps, more particularly of central lubricating installations of machines, and consists substantially in this, that the delivery of the lubricating pump is regulated, while maintaining a definite, preferably optionally selectable minimum delivery, in dependence on the speed of the machine to be lubricated.

It is a fact, that the theoretical lubricant requirement of a machine depends on the operative state at any time, that is, on the speed of revolution of the machine. Through the expedient of regulating the delivery of lubricant in dependence on the rotational speed of the machine, a saving in lubricant is obtained and excessive lubrication tending to foul the machine is avoided, whilst through the maintenance of a definite minimum delivery by the pump the lubrication at all operative conditions of the machine to be lubricated is ensured. The regulation of the lubricant delivery must not be so carried out that the delivery of the lubricant starts with zero when the machine is at rest, for then the necessary preliminary lubrication with the machine at rest by turning the handle of the lubricating pump would be rendered impossible, as all the pump units of the central lubricating installation would at this moment be set to the delivery quantity zero. If, however, on the other hand the regulation is carried out so as to start from a certain delivery quantity of the pump unit with the machine at rest, the delivery quantity may in certain circumstances increase with the speed of the machine to such an extent that even at normal speed and all the more at higher speeds there will be a wastage of lubricant.

Thus, according to the invention the delivery of the lubricating pump is set according to a certain, preferably optionally selectable rotational speed of the machine to be lubricated, whilst the regulation only starts when this speed limit is exceeded. Above a definite speed limit the lubricant delivery can be regulated in dependence on the speed of the machine to be lubricated. Owing to the circumstance, that the regulation starts up only from a certain limit the dependence ratio selected may be a simple, for instance a linear one, without prejudicing the lubrication conditions below this limit.

According to the invention the arrangement for carrying out this method has a regulating member which regulates the quantity delivered by the lubricating pump in dependence on the speed of the machine to be lubricated and a member which keeps unchanged the delivery quantity of the pump until the machine reaches a definite speed limit, the arrangement being such that this regulating member can act on some or all of the pump units of the lubricating pump jointly. Suitably by an adjustable stop the action of the regulating member on the lubricant delivery is cut out below a certain speed limit.

The regulation can be derived in a simple manner from a speed governor, whilst the effect of the regulation on the pump delivery can be determined empirically in such a manner the delivery will correspond to the lubricant requirement at the corresponding speed, it may even occur, that in certain higher speed ranges the lubrication may be reduced.

In the accompanying drawing the invention is illustrated diagrammatically with reference to constructional examples.

Figure 1:
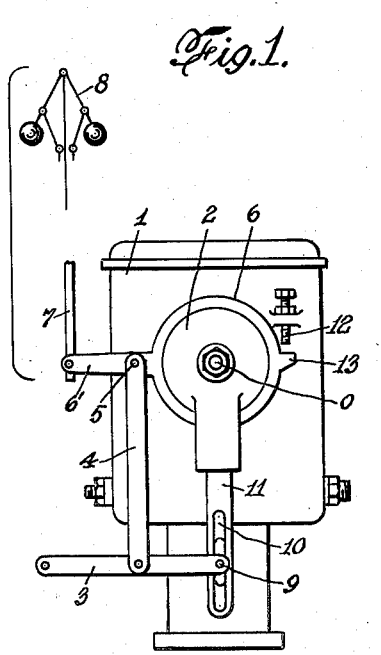
Figure 1 is a front view of a lubricating pump with its delivery regulating device.

In Fig. 1 a lubricating pump 1 is shown, the control mechanism of which is driven by means of a connecting rod 3 from the machine lubricated by the lubricating pump. The rod 3 is connected by means of a rod 4 at 5 to the lever 6' of a part 6 which is adapted to rock about the center O of the control mechanism O, which is connected by way of a pull bar 7 with a centrifugal governor. As the speed of the machine increases, the governor 8 displaces the lever 6' and with it the driving bar 3 upwards. At the same time the point of application 9 of the driving bar 3 slides upwards in a slot 10 of the control lever 11 connected to the control mechanism 2, so that the throw of the control lever and consequently the delivery of lubricant is increased. When the speed of the machine decreases, there is an opposite displacement of the point of application 9, whereby the throw of the control lever is reduced.

In order to prevent a further reduction of the throw of the control lever and consequently of the lubricant delivery, when the speed of the machine drops below a predetermined amount, a stop 12 in the form of an adjustable screw is provided on the casing of the pump 1, against which a lug 13 which is rigidly connected to the lever 6' strikes at the predetermined machine speed, whereby a further reduction of the throw of the control mechanism and consequently of the lubricant delivery is prevented. All the outlets of the lubricating pump will therefore always deliver the same quantity below this predetermined speed which may be selected within certain limits by means of an adjustment of the screw stop 12. Only when the speed increases above this predetermined amount and the governor 8 draws the lever 6' upwards, lifting the lug 13 from the stop 12, will the throw of the control lever be increased, the delivered quantities increasing with the increasing speed of the machine.

Figure 2:
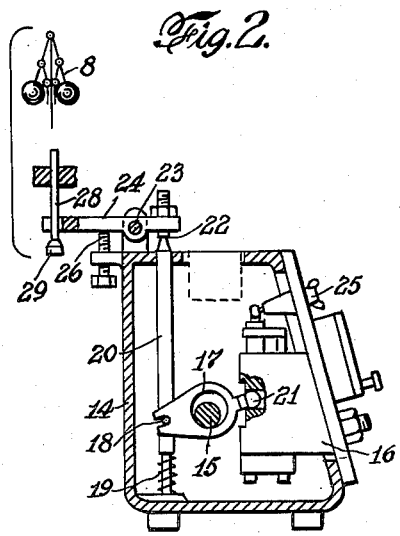
Fig. 2 is a sectional view of a lubricating pump having a modified form of delivery regulating device.

The central lubricating pump, Fig. 2, is shown in section. It comprises in its casing 14 an eccentric shaft 15 which for driving each pump unit 16 supports on the appropriate eccentric an oscillating member 17. This member embraces with a fork a traverse pin 18 of a rod 20 which is forced upward by a spring 19. At its other end the oscillating member 17 has a ball pivot 21 which drives the pump unit 16.

The rod 20 strikes with its upper end against a set screw 22 in a two-armed lever 24 adapted to rock about a bolt 23 fixed to the casing 14. On the lever 24 a series of such set screws 22 is provided for the corresponding pump units 16. These set screws 22 serve the purpose of correcting the adjustment of the regulating devices 25 of the pump units, so that any subsequent tooling of the part for establishing agreement of the adjustment of the regulating devices 25 with the adjustment of the pump units becomes unnecessary.

On the pump casing 14 an adjustable stop 26 for the left hand arm of the lever 24 is provided. The lever 24 has a forked end 27 which embraces a rod 28, to which motion is imparted by the governor 8 which is driven in dependence on the speed.

The governor 8 and the rod 28 occupy the positions shown in the drawings, when the machine is at rest. As the speed of the machine increases the rod 28 is raised, until finally at a predetermined speed which can be set for by the screw stop 26 a collar 29 of the rod 28 strikes against the left-hand arm of the lever 24 and carries it up with it. This causes the rods 20 to be forced downwards by the right-hand arm of the lever 24 and the reciprocating motions of the pump units 16 will take place in a somewhat higher range, which corresponds to an increase in the quantities delivered. On the machine speed decreasing, the rod 28 will move downwards again and the quantities delivered by the pump units 16 will be decreased until the lever 24 strikes against the screw stop 26, when any further drop in the machine speed down to stoppage will not result in any further decrease in the quantities delivered.

Figure 3:
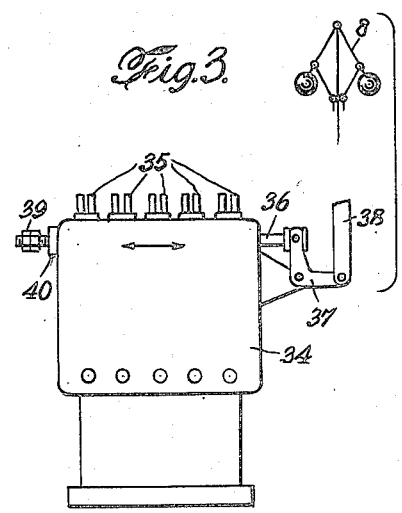
Fig. 3 is a side view of the lubricating pump with another form of delivery regulating system.

In the constructional example according to Fig. 3 a lubricating pump 34 is illustrated, the regulating devices 35 of which are connected by a bar 36, for instance a rack, in such a manner that by moving this bar to the left or right all the regulating devices 35 of the pump units are displaced by the same amount. A movement of the bar 36 to the right brings about a reduction and the opposite movement an increase of the lubricating pump delivery of all the pump units. By a bell crank 37 and the rods 38 this action on the lubricating pump is effected by the governor 8 in dependence on the speed. At the left-hand end of the bar 36 an adjustable stop 39 is provided, so that, on the machine speed dropping until this stop 39 strikes against a projection 40 of the casing, a reduction in the quantity delivered by all the pump units will take place. On the machine speed continuing to drop until the machine is at rest, the stop 39 will rest against the projection 40, so that the quantities delivered cannot be further reduced.

What I claim is:

1. A lubricating system for use with a machine having a plurality of lubricant receiving locations and operating at various rotational speeds, comprising a lubricating pump aggregate operatively connected to be operated by said machine having a plurality of outlets, means for connecting said outlets to said locations, a plurality of pumping units in said pump for delivering lubricant to said respective locations in predetermined quantities, means for varying the delivery capacity of said pump aggregate, means for controlling said delivery varying means in response to the rotational speed of the machine connected thereto, and means for rendering ineffective said control means in positions thereof corresponding to speed below a predetermined speed.

2. A lubricating system for use with a machine having a plurality of lubricant receiving locations and operating at various rotational speeds, comprising a lubricating pump aggregate operatively connected to be operated by said machine having a plurality of outlets, means for connecting said outlets to said locations, a plurality of pumping units in said pump for delivering lubricant to said respective locations in predetermined quantities, first means common to said pumping units for controlling the delivery capacity thereof, second means driven by said machine for controlling said first control means to increase the delivery capacity in response to higher rotational speeds, and a stopping member for limiting the operability of said first control means for the decrease of the delivery capacity and the controlling action of said second control means at lower rotational speeds.

3. A lubricating system for use with a machine having a plurality of lubricant receiving locations and operating at various rotational speeds, comprising a lubricating pump aggregate operatively connected to be operated by said machine having a plurality of outlets, means for connecting said outlets to said locations, a plurality of pumping units in said pump for delivering lubricant to said respective locations, a centrifugal governor disposed to be driven by said machine having portions movable in a given direction with increased rotational speed, means for increasing the delivery capacity of said pump aggregate, and means operatively linking said delivery increasing means and said movable portions upon attainment of a given rotational speed, whereby said delivery increasing means is actuated for increased delivery at above said given rotational speed.

4. A lubricating system for use with a machine having a plurality of lubricant receiving locations and operating at various rotational speeds, comprising a lubricating pump aggregate operatively connected to be operated by said machine having a plurality of outlets, means for connecting said outlets to said locations, a plurality of pumping units in said pump for delivering predetermined quantities of lubricant to said respective locations, a shaft for said pump aggregate, a control mechanism on said shaft having a variable control stroke, means linking said mechanism to said machine for actuation thereof for each revolution, means driven by the machine assuming respective operative positions in response to the rotational speeds of the machine, a member for adjusting the said control stroke having an operative connection with said speed responsive means whereby the stroke is increased with higher speeds, and an adjustable stopping member for limiting the operability of said stroke control member and for limiting any decrease of said stroke to a value corresponding to that of a predetermined rotational speed.

5. A lubricating system for use with a machine having a plurality of lubricant receiving locations and operating at various rotational speeds, comprising a lubricating pump aggregate operatively connected to be operated by said machine having a plurality of outlets, means for connecting said outlets to said locations, a plurality of pumping units in said pump for delivering lubricant to said respective locations, a centrifugal governor disposed to be driven by said machine, movable means for varying the delivery capacity of said pump aggregate, said delivery varying means being connected to said governor in such manner that the lubricant delivery is increased with increasing speeds and lubricant delivery is decreased with decreasing speeds, and a stop engageable by said delivery varying means for limiting the lubricant decreasing movement of said means at a position corresponding to a given rotational speed.

6. A lubricating system for use with a machine having a plurality of lubricant receiving locations and operating at various rotational speeds, comprising a lubricating pump aggregate operatively connected to be operated by said machine having a plurality of outlets, means for connecting said outlets to said locations, a plurality of pumping units in said pump for delivering lubricant to said respective locations, a centrifugal governor disposed to be driven by said machine, movable means for varying the delivery capacity of said pump aggregate, said delivery varying means being connected to the said governor in such manner that the lubricant delivery is increased with increasing speeds and lubricant delivery is decreased with decreasing speeds, and an adjustable stop engageable by said delivery varying means for limiting the lubricant decreasing movement of said means at a position corresponding to a variable selected rotational speed.

HEINRICH ETZELT.

REFERENCES CITED

The following references are of record in the file of this patent:

UNITED STATES PATENTS

| Number | Name | Date |
| --- | --- | --- |
| 1,054,808 | Waldon | Mar. 4, 1913 |
| 1,121,976 | Chandler | Dec. 22, 1914 |
| 1,724,865 | Allen | Aug. 13, 1929 |
| 1,929,108 | Berry | Oct. 3, 1933 |

FOREIGN PATENTS

| Number | Country | Date |
| --- | --- | --- |
| 3,840 | Great Britain | 1909 |
| 28,614 | Great Britain | 1911 |